W. & W. H. Lewis,
Coating Daguerreotype Plates,
N° 10,233.        Patented Nov. 15, 1853.
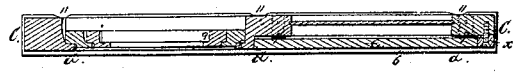
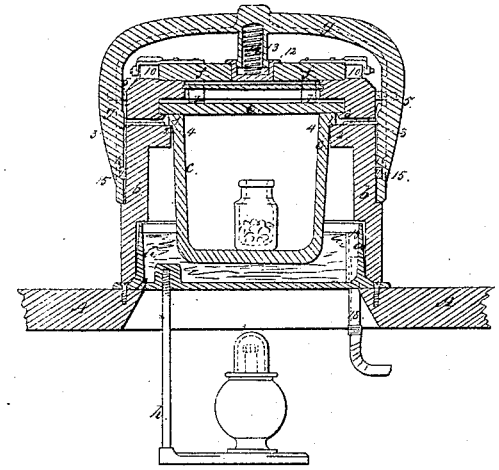
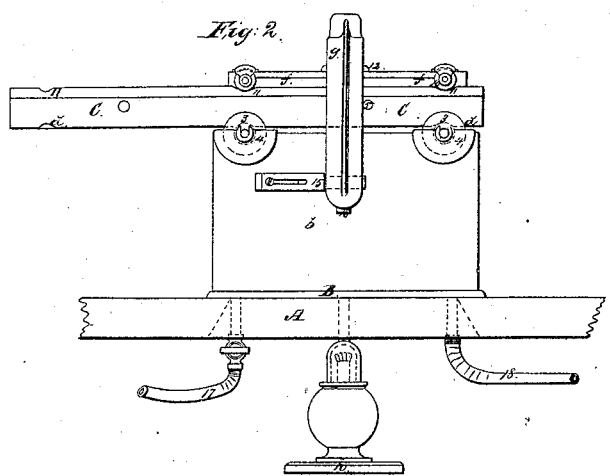
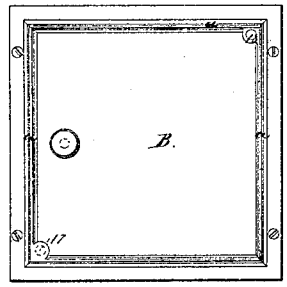
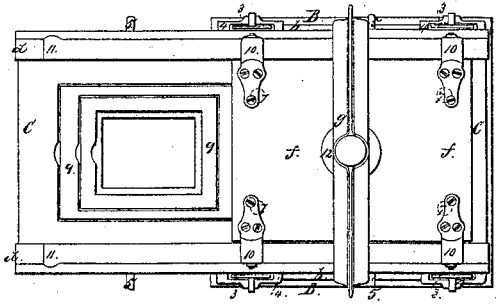
Witnesses:        Inventor:
Lemuel W. Serrell.        Will™ Lewis
Thomas G. Harold        W. H. Lewis
AM. PHOTO-LITHO. CO. N.Y. (OSBORNE'S PROCESS)

UNITED STATES PATENT OFFICE.

WILLIAM LEWIS AND WILLIAM H. LEWIS, OF NEW YORK, N. Y.

IMPROVED COATING-BOX FOR DAGUERREOTYPE-PLATES.

Specification forming part of Letters Patent No. 10,233, dated November 15, 1853.

*To all whom it may concern:*

Be it known that we, WILLIAM LEWIS and WILLIAM H. LEWIS, of the city and State of New York, manufacturers of daguerreotype apparatus, have invented, made, and applied to use certain new and useful Improvements in Apparatus Used in Chemically Preparing Surfaces for the Daguerreotype or Similar Processes; and we do hereby declare that the following is a full, clear, and exact description of the construction and operation of the same, reference being had to the annexed drawings, making part of this specification, wherein—

Figure 1 represents in plan the coating-box complete. Fig. 2 is a side elevation. Fig. 3 is a vertical cross-section. Fig. 4 is a plan of the metallic bottom of the coating-box; and Fig. 5 is a longitudinal section through the slide that carries the plate.

The like marks of reference designate the same parts in the figures.

In the daguerreotype and other similar processes for producing pictures, the plate has to be coated with certain chemicals—such as iodine, bromine, &c.—previous to being placed in the camera, this being effected in what is termed the "coating-box." Our improvements on this box consist, first, in means to apply either heat or cold to the chemical to regulate the evaporation thereof, as required, and according to the state of the weather, the chemical in summer time evaporating too quickly, while in winter it is too slow in its operation; second, in fitting the glass pot containing the chemicals, so that it is less liable to break; third, in providing the slide carrying the daguerreotype-plate or other surface to be coated with inclined ways taking rollers, so that the slide is slightly lifted and the friction relieved on commencing to move the same, thereby relieving the parts from wear, causing them to remain tight in their joint a longer time, and the slide is also moved with greater ease; fourth, in fitting the cap or cover with rollers taking similar inclines on top of the slide by which the friction above is also relieved; fifth, in the means for securing to the slide and adjusting the plate of glass that sets over the pot containing the chemicals; sixth, in the means of attaching the yoke that passes over the slide to keep it down to the box.

In the accompanying drawings, A is a table or support, to which the base B of the box is attached by screws. This base is formed with a flange $a$ around its edges, which make a hollow metallic box, outside of which and fitting close thereto is a wooden box $b$, the upper edges of which are formed as a flange or support 2, taking within the opening a glass pot $c$, formed with a bead or lip 1 around its upper edge by which the same is suspended. The upper surface of the sides of this pot is ground flat, so as to form a tight joint with a glass plate in the slide above, hereinafter referred to. Within this glass pot the chemicals to be used are placed.

The bed or support A is removed near the center of the base B, so as to attach a stand $h$ to the base, which carries when needed a lamp by which the metallic base is warmed or heated, which warms the glass pot and chemicals, and 17 is a supply-pipe and cock passing into one corner of the base within the sides $a$, by which cold or ice water is to be supplied; and 18 is an overflow-pipe in another corner of a height to preserve the water at the required level within the box $a$. By these two means heat or cold may be applied as required, and a thermometer may be used, if found necessary, to designate the temperature.

3 3 are rollers in boxes 4, let into the upper edge of the box $b$ at each corner thereof, receiving the slide C, which carries the glass that sets over the pot when not in use, also the plate or surface to be coated.

$d$ $d$ are the ways that travel on the rollers, and by reference to Fig. 2 it will be seen that the lower surfaces are slightly removed to form inclines in the middle and near each end, so that the moment the slide is shoved in either direction it is lifted by the inclines running up on the rollers, in which position it moves till near the end of its motion, when it is again allowed to descend, the inclines passing clear of the rollers.

The slide $c$ is fitted at one end with a flat glass plate set in rabbets 6 in the slide, in which position it is retained by a blocking-piece $x$, screwed at one end. 7 are adjusting-screws, with a piece of cloth or cork between their inner ends and the glass, which serve the purpose of keeping the face of the glass to the rabbet, retaining it in the proper position, whatever the thickness of the glass may be. At the other end of the slide a rabbet 8 (see Fig. 5) receives a daguerreotype-plate or other surface to be coated, or the frames 9 are used to receive smaller plates when required.

*g* is a metal yoke with ribs 16 passing into grooves cut in the sides of the box *b*, which ribs at one point on each side are removed to allow the passage of a sliding bolt or catch 15, by which the yoke is retained in place or removed, as required.

The yoke *g* has on its under side in the center a hollow hub 13, receiving a spring 14, which hub and spring set within a socket 12 in a cover *f*, that is of a size to set on the slide C, and by a spring 14 keep the same down onto the pot.

The cover *f* is provided with rollers 10, which, when the slide is at the extreme points of motion, lie in notches or inclines 11. The operator, having put the daguerreotype or other plate to be coated in the rabbet 8 or frame 9, pushes on the slide to carry the plate toward the chemical-pot, and the moment the slide moves the rollers 3, acting on the inclines, slightly lift the slide, relieving the glass plate *e* and top of the pot from wear and the parts from friction. At the same time the rollers 10 and cover *f* are raised by the inclines 11, relieving the friction of the cover, and the slide rolls freely to its place with the surface to be coated over the chemical-pot. At which point, the inclines again coming on the line of the rollers, the spring 14 forces the parts down to place, keeping the joint between the chemical-pot and slide tight, the reverse motion of the slide being given to take the plate out, the glass plate *e* again covering the chemical-pot tightly; and it will be seen that the socket 12 and spring 14, being in the center of the cover *f*, the cover will take a more even and better bearing on the slide than if the ordinary bow-spring across the top of the cover were used. At the same time the parts are stronger and more compact.

The motion of the slide may be determined by stops 5, taking the sides of the yoke or any other suitable means.

We are aware that glass pots have been used to contain the chemical, and that these pots have in some cases been provided with a slight bead or rim; but we are not aware that any coating-box has been made so as to suspend the pot by a rim or bead, which arrangement prevents what often occurs of the pot getting a slight twist or cant as it stands on its bottom, which either breaks the pot or glass plate covering the same when the slide is moved, and we are aware that the slide has been fitted with a glass set into a beveled or V-shaped rabbet on each side to retain the same in place; but we are not aware of any slide having been fitted with rabbets to take the lower face of the glass, combined with screws or similar means to keep the glass to said rabbet, whereby different thicknesses of glass can be put in and that without grinding the edges to a bevel, as heretofore, and we are aware that the cap and spring have been used to keep the slide down onto the pot. Therefore we do not claim them, and although we prefer to use all the parts of our coating-box together, still the different features of invention may be used with any character of coating-box without using all or any of the other features of the invention. Therefore What we desire to secure by Letters Patent is—

1. The metallic base formed as a box *a*, to which either cold water or heat is to be applied to regulate the temperature of the chemicals in the coating-box, as described and shown.

2. Suspending the glass pot within the coating-box by means of a flange or bead on the upper edge thereof taking the upper surface of the box, as specified.

3. The rollers 3, in combination with the ways *d*, formed with the inclines to relieve the friction, as specified.

4. The rollers 10 on the covers *f*, combined with the ways and inclines 11 on the slide to lift the cover and relieve friction, as specified.

5. The rabbets 6 to support the glass on the lower surface thereof, in combination with the screws 7 to retain the same against the rabbets, as specified.

6. Securing the metal yoke *g* in place by means of ribs 16 on the inner sides of the vertical parts thereof and the slides 15, as described and shown.

7. The hub 13 on the yoke taking the socket 12 in the cover *f* and containing the spring 14, whereby the cover is retained in place, but allowed to take its proper bearing, as described and shown.

In testimony whereof we have hereunto set our signatures this 16th day of July, 1853.

WILLM. LEWIS.
W. H. LEWIS.

Witnesses:
LEMUEL W. SERRELL,
THOMAS G. HAROLD.